(12) United States Patent
Kwan

(10) Patent No.: US 11,753,558 B2
(45) Date of Patent: Sep. 12, 2023

(54) DRY ERASE INKS AND ASSOCIATED WRITING INSTRUMENTS

(71) Applicant: Sanford L.P., Atlanta, GA (US)

(72) Inventor: Wing Sum Vincent Kwan, Alpharetta, GA (US)

(73) Assignee: SANFORD, L.P., Atlanta, GA (US)

( * ) Notice: Subject to any disclaimer, the term of this patent is extended or adjusted under 35 U.S.C. 154(b) by 0 days.

(21) Appl. No.: 17/763,514

(22) PCT Filed: Sep. 29, 2020

(86) PCT No.: PCT/US2020/053272
§ 371 (c)(1),
(2) Date: Mar. 24, 2022

(87) PCT Pub. No.: WO2021/067267
PCT Pub. Date: Apr. 8, 2021

(65) Prior Publication Data
US 2022/0372313 A1    Nov. 24, 2022

Related U.S. Application Data

(60) Provisional application No. 62/908,757, filed on Oct. 1, 2019.

(51) Int. Cl.
*C09D 11/17* (2014.01)
*C09D 11/16* (2014.01)
*B43K 8/00* (2006.01)

(52) U.S. Cl.
CPC .............. *C09D 11/17* (2013.01); *B43K 8/003* (2013.01); *C09D 11/16* (2013.01)

(58) Field of Classification Search
CPC ......... C09D 11/17; C09D 11/16; C09D 11/32; C09D 11/54; B43K 8/003
USPC .................................. 106/31.19, 31.2, 31.23
See application file for complete search history.

(56) References Cited

U.S. PATENT DOCUMENTS

| | | | | |
|---|---|---|---|---|
| 5,037,702 A | * | 8/1991 | Pitts ....................... | D21H 25/06 427/372.2 |
| 2009/0292069 A1 | | 11/2009 | Lee et al. | |
| 2010/0063186 A1 | | 3/2010 | Onyenemezu | |
| 2012/0316276 A1 | | 12/2012 | Iwasa et al. | |
| 2013/0029311 A1 | * | 1/2013 | Goscha ..................... | B43L 1/00 523/435 |
| 2019/0153250 A1 | * | 5/2019 | Donbrosky, Jr. ......... | B32B 7/12 |

FOREIGN PATENT DOCUMENTS

| | | |
|---|---|---|
| EP | 0874028 B1 | 6/2003 |
| WO | 2019067757 A1 | 4/2019 |
| WO | 2020123914 A1 | 6/2020 |

OTHER PUBLICATIONS

International Search Report of PCT/US2020/053272 dated Dec. 7, 2020, 3 pages.

* cited by examiner

*Primary Examiner* — David J Walczak
(74) *Attorney, Agent, or Firm* — EVERSHEDS SUTHERLAND (US) LLP

(57) ABSTRACT

Dry erase ink formulations containing a resin, a pre-assembled colorant, and a solvent, wherein the dry erase ink formulation has a surface tension of at least 25 dynes per centimeter, and writing instruments including a dry erase ink formulation are provided herein.

19 Claims, 2 Drawing Sheets

DRY ERASE INKS AND ASSOCIATED WRITING INSTRUMENTS

CROSS REFERENCE TO RELATED APPLICATIONS

This application is a 35 U.S.C. § 371 national stage application of PCT Patent Application No. PCT/US2020/053272, filed Sep. 29, 2020, which claims priority benefit of U.S. Provisional Application No. 62/908,757, filed Oct. 1, 2019, the disclosures of which are incorporated by reference herein in their entireties.

FIELD OF THE DISCLOSURE

This disclosure generally relates to ink formulations, and associated methods and writing instruments, and more specifically relates to dry erase inks, and writing instruments including the same.

BACKGROUND

Dry erase ink formulations are known. However, many of these dry erase ink formulations can only been erased after being applied to a dry erase board or white board specifically designed for this purpose. Accordingly, there is a need for improved dry erase ink compositions which can be erased from surfaces other than a dry erase board.

BRIEF DESCRIPTION OF THE DRAWINGS

The detailed description is set forth with reference to the drawings, which are meant to be exemplary and not limiting, illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

SUMMARY

Figure 1:
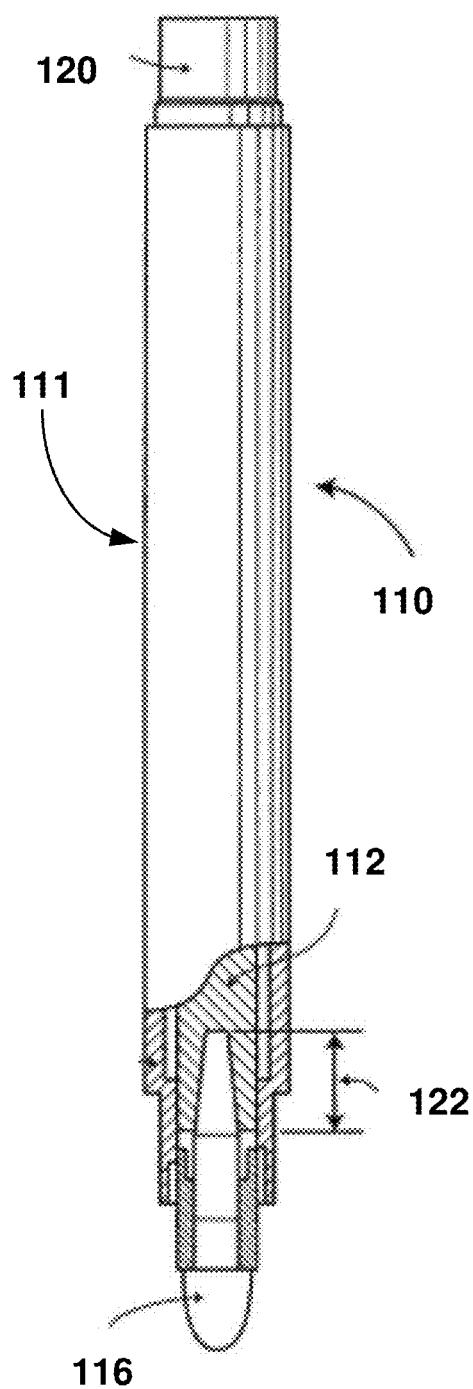
FIG. 1 illustrates a partial cutaway view of an embodiment of a writing instrument according to the present disclosure.

In one aspect, dry erase ink formulations are provided. Dry erase ink formulations may include a resin, a pre-assembled colorant, and a solvent, wherein the dry erase ink formulation has a surface tension of at least 25 dynes per centimeter.

In another aspect, writing instruments are provided. Writing instruments may include a writing tip portion connected to a tubular member or refill defining an ink reservoir and a dry erase ink formulation disposed in the ink reservoir.

DETAILED DESCRIPTION

Dry erase ink formulations and writing instruments including dry erase ink formulations are provided herein.

As used herein, the term "colorant" is used broadly to refer to a substance that imparts a desired color to an ink formulation. For example, a colorant may be a dye, a pigment, or a pigment-dye hybrid.

Pigments may include commercially-available pigments. For example, pigments may include pigments available from Bayer Corp. such as cyan pigment, C.I. Pigment Blue 15:3 like Palomar Blue B-4810 PB 15:3, Palomar Blue B-4710 PB 15:1, Palomar Blue B-4900, C.I. Pigment Red 122 (quinacridone); magenta pigments such as Quindo Magenta RV-6828 Pigment Red 122, Quindo Magenta RV-6831 Pigment Red 122 presscake, Quindo Red R-6713 PV 19, Quindo Magenta RV-6843 Pigment Red 202, C.I. Pigment Yellow 74, 97, 138, 139, 151, 154, 155, 185, 180 yellow pigments include Fanchon Fast Y-5700 PY 139 and Fanchon Fast Yellow Y-5688 C.I. Pigment Yellow 150 pigments; pigments available from Sun Chemical Corp. such as Sunfast Blue 15:3 presscake and Sunfast Blue 15:3 powder; and Sunfast Magenta 122 and fast Magenta 202 pigments, Sunbrite Yellow 14 presscake and Spectra Pac Yellow 83 pigments; pigments available from Clariant Corp. such as Sandorin Yellow; pigments available from Ciba Geigy such as Irgazin Yellow 2RLT PY 110, Irgazin Yellow 2GLTN PY 109, Irgazin Yellow 2GLTE PY 109, and Irgazin Yellow 3RLTN PY 110 pigments; pigments from Degussa Corporation including carbon black, such as Special Black 4, Special Black 5, Special Black 6, Special Black 4A, Color Black FW 200, and Color Black FW2 pigments; pigments available from Columbian Chemical Corp. such as Raven 1200 carbon black, Raven 1170 carbon black, Raven 3500 carbon black, and Raven 5750 carbon black pigments; pigments available from Cabot Corp. such as Mogul L carbon black and Sterling NS carbon black; and pigments available from Mitsubishi Kasei Corp. such as Carbon Black MA-100 pigment.

Dyes may include commercially-available dyes. For example, dyes may include Direct dyes such as Direct Blue 73, Direct Blue 79, Direct Blue 199, Direct Blue 280, Direct Black 19, Direct Red 28, Direct Red 224 and so on. Dyes may include Basic dyes such as Basic Red 14, Basic Red 15, Basic Blue 9, Basic Yellow 37 and so on. Dyes may include disperse dyes, which may be prepared to be dispersed in the solvent first prior to being used in the final formulation. Dyes may include acid dyes, such as Acid Violet 17, Acid Blue 113, Acid Red 88, Acid Black 1, and Acid Blue 25.

Pigment-dye hybrids may include commercially-available pigment-dye hybrids. For example, pigment-dye hybrids may include Microsphere Pigment MP and A/AX Thermoplastic pigments from Dayglo; Radglo series (AFN and AFX) from Radiant Colors; fluorescent pigments from Ignite series from Smooth-on Inc., and the like.

As used herein, the term "pre-assembled colorant" is used broadly to refer to a colorant that is pre-arranged, or exists at the time of incorporation into the relevant formulation, in a three-dimensional matrix. For example, pre-assembled colorants include colorant-coated microspheres, colorant-infused microspheres, and colorant-plated pigment flakes. Pre-assembled colorants may include commercially-available pre-assembled colorants, such as Evoque 1180 available from Dow, a coated microsphere pre-assembled colorant; Microsphere 230 MD available from Dinichiseika, a colorant-infused microsphere pre-assembled colorant; and Mearlin Exterior CFS Fine Brass 2323V available from BASF, a colorant-plated flake.

As used herein, the term "conventional colorant" is used broadly to refer to a colorant that is not a pre-assembled colorant.

As used herein, the term "erased" is used broadly to indicate that at least a portion of the colored components of an ink formulation has been removed from a substrate, or have been rendered colorless or transparent. As used herein, the phrase "substantially erased" is used broadly to indicate that substantially all of the colored components of an ink formulation have been removed from a substrate, or have been rendered colorless or transparent.

Dry Erase Ink Formulations

Dry erase ink formulations are provided herein. In some embodiments, the dry erase ink formulations includes a resin, a pre-assembled colorant, and a solvent, wherein the dry erase ink formulation has a surface tension of at least 25 dynes per centimeter. For example, in some embodiments the dry erase ink formulations have a surface tension of about 25 dynes per centimeter, about 30 dynes per centimeter, about 35 dynes per centimeter, about 40 dynes per centimeter, about 45 dynes per centimeter, about 50 dynes per centimeter, about 55 dynes per centimeter, about 60 dynes per centimeter, about 65 dynes per centimeter, about 70 dynes per centimeter, or any ranges therebetween. For example, in some embodiments the dry erase ink formulations have a surface tension of from about 25 dynes per centimeter to about 70 dynes per centimeter, for example from about 30 dynes per centimeter to about 50 dynes per centimeter.

In some embodiments, the resin is present in the dry erase ink formulation in an amount of at least about 1 wt. %, at least about 5 wt. %, or at least about 10 wt. %. For example, in some embodiments, the resin is present in the dry erase ink formulation in an amount of about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 15 wt. %, about 20 wt. %, about 25 wt. %, about 30 wt. %, about 35 wt. %, about 40 wt. %, about 45 wt. %, about 50 wt. %, or any ranges therebetween. For example, in some embodiments the resin is present in the dry erase ink formulation in an amount of from about 5 wt. % to about 50 wt. %, for example from about 10 wt. % to about 30 wt. %.

In some embodiments, the pre-assembled colorant is present in the dry erase ink formulation in an amount of at least about 1 wt. %, at least about 5 wt. %, or at least about 10 wt. %. For example, in some embodiments, the pre-assembled colorant is present in the dry erase ink formulation in an amount of about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 15 wt. %, about 20 wt. %, about 25 wt. %, about 30 wt. %, about 35 wt. %, about 40 wt. %, about 45 wt. %, about 50 wt. %, or any ranges therebetween. In some embodiments, the pre-assembled colorant is present in the dry erase ink formulation in an amount of from about 5 wt. % to about 50 wt. %, for example from about 10 wt. % to about 30 wt. %.

In some embodiments, the solvent is present in the dry erase ink formulation in an amount of at least about 10 wt. %, from about 10 wt. % to about 25 wt. %, or from about 10 wt. % to about 15 wt. %. For example, in some embodiments, the solvent is present in the dry erase ink formulation in an amount of about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, or any ranges therebetween. For example, in some embodiments, the solvent is present in the dry erase ink formulation in an amount of from about 30 wt. % to about 80 wt. %, for example from about 30 wt. % to about 50 wt. %.

In some embodiments, the dry erase ink formulation further includes a conventional colorant. For example, the dry erase ink formulation may contain a commercially-available pigment. For example, pigments may include pigments available from Bayer Corp. such as cyan pigment, C.I. Pigment Blue 15:3 like Palomar Blue B-4810 PB 15:3, Palomar Blue B-4710 PB 15:1, Palomar Blue B-4900, C.I. Pigment Red 122 (quinacridone); magenta pigments such as Quindo Magenta RV-6828 Pigment Red 122, Quindo Magenta RV-6831 Pigment Red 122 presscake, Quindo Red R-6713 PV 19, Quindo Magenta RV-6843 Pigment Red 202, C.I. Pigment Yellow 74, 97, 138, 139, 151, 154, 155, 185, 180 yellow pigments include Fanchon Fast Y-5700 PY 139 and Fanchon Fast Yellow Y-5688 C.I. Pigment Yellow 150 pigments; pigments available from Sun Chemical Corp. such as Sunfast Blue 15:3 presscake and Sunfast Blue 15:3 powder; and Sunfast Magenta 122 and fast Magenta 202 pigments, Sunbrite Yellow 14 presscake and Spectra Pac Yellow 83 pigments; pigments available from Clariant Corp. such as Sandorin Yellow; pigments available from Ciba Geigy such as Irgazin Yellow 2RLT PY 110, Irgazin Yellow 2GLTN PY 109, Irgazin Yellow 2GLTE PY 109, and Irgazin Yellow 3RLTN PY 110 pigments; pigments from Degussa Corporation including carbon black, such as Special Black 4, Special Black 5, Special Black 6, Special Black 4A, Color Black FW 200, and Color Black FW2 pigments; pigments available from Columbian Chemical Corp. such as Raven 1200 carbon black, Raven 1170 carbon black, Raven 3500 carbon black, and Raven 5750 carbon black pigments; pigments available from Cabot Corp. such as Mogul L carbon black and Sterling NS carbon black; and pigments available from Mitsubishi Kasei Corp. such as Carbon Black MA-100 pigment.

In some embodiments, the resin has a molecular weight of at least about 1000 amu or at least about 5000 amu. For example, in some embodiments the resin has a molecular weight of about 1000 amu, about 1500 amu, about 2000 amu, about 2500 amu, about 3000 amu, about 3500 amu, about 4000 amu, about 4500 amu, about 5000 amu, about 5500 amu, about 6000 amu, about 6500 amu, about 7000 amu, about 7500 amu, about 8000 amu, about 8500 amu, about 9000 amu, about 9500 amu, 10,000 amu, or any ranges therebetween.

In some embodiments, the resin includes poly(styrene-butadiene), carboxylate-terminated poly(styrene-butadiene), or a combination thereof. In some embodiments, the resin includes Rovene® 6009, a styrene-acrylic emulsion polymer commercially available from Mallard Creek Polymers, Butonal® NS125, a resin-oil compatible styrene butadiene dispersion commercially available from BASF, or a combination thereof.

In some embodiments, the solvent comprises water, glycerol, propylene glycol, a polyalkylene glycol, a glycol ether, a poly(glycol) ether, a caprolactam, a formamide, an acetamide, a long chain alcohol, or any combination thereof. For example, in some embodiments, the solvent comprises N-methyl pyrrolidone, 1,5-pentanediol, 2-pyrrolidone, diethylene glycol, triethylene glycol, tetraethylene glycol, 1,3-(2-methyl)-propanediol, 1,3,5-(2-methyl)-pentanetriol, tetramethylene sulfone, 3-methoxy-3-methylbutanol, glycerol, a 1,2-alkyldiol, or any combination thereof.

In some embodiments, the pre-assembled colorant has a particle size of at least about 1 µm, for example about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, about 20 µm, or any ranges therebetween. For example, in some embodiments the pre-assembled colorant has a particle size of from about 1 µm to about 20 µm, for example from about 5 µm to about 12 µm.

In some embodiments, the pre-assembled colorant is Evoque™ 1180, a pre-composite polymer available from Dow, Microsphere 230 MD, an acrylic polymer incorporating pigment in the form of a microsphere available from Dainichiseika, or Mearlin Exterior CFS Fine Brass 2323V, a pearlescent pigment with an orange sheen metallic look, available from BASF.

In some embodiments, the ink formulation includes shear-thinning imparting agents, for example, nonionic surfactants having a specific HLB value, xanthan gum, welan gum, succinoglycan (organic acid-modified heteroglycan composed of glucose unit and galactose unit, having an average molecular weight of about 100 to 8,000,000), guar gum, locust bean gum, hydroxyethyl cellulose, alkyl alginates, polymers mainly composed of alkyl methacrylate and having a molecular weight of 100,000 to 150,000, glycomannan, hydrocarbons having a gelling ability and extracted from seaweed such as agar or carrageenan, benzylidenesorbitol or derivatives thereof, crosslinking acrylic acid polymers and the like, hydrophobically-modified ethoxylated urethane (HEUR) thickeners, alkalai-swellable emulsion (ASE) thickeners, hydrophobically-modified alkali-swellable emulsion (HASE) thickeners, associative thickeners, and non-associative thickeners are used alone or mixed in combination.

In some embodiments, the ink formulation includes other additives such as additional colorants, binders, viscosity modifiers, thixotropic agents, preservatives, lubricants, pH adjustors, antiseptics or fungicides, wetting agents, defoamers, dispersants, surfactants, humectants, biocides, and the like.

In some embodiments, the ink formulation may be configured to be delivered from a marker type writing instrument, such as an Expo® marker. In some embodiments, the ink formulation may be configured to be delivered from a writing brush pen.

In some embodiments, the ink formulations may be considered erased when each formulation would be considered erased by an average consumer. Thus, in some embodiments, determining whether an ink formulation has been erased may involve a qualitative determination.

In some embodiments, the erasure of the ink formulations described herein may be evaluated using the Likert scale, wherein write test samples may be evaluated before and after attempted erasing on a 5-point scale. According to the Likert scale, 5 represents no color change, 4 represents slight discoloration, 3 represents moderate discoloration, 2 represents severe discoloration, and 1 represents complete color elimination. In some embodiments, the ink formulations may be considered erased when they are rated with a moderate discoloration, severe discoloration, or complete color elimination according to the Likert scale.

In some embodiments, whether the dry erase ink formulation has been erased may be quantitatively evaluated with a color measurement instrument. In some embodiments the color measurement instrument may be a spectrophotometer, while in some embodiments the color measurement instrument may be a spectrodensitometer.

In some embodiments, color differences before and after erasure may be identified using the Commission Internationale de l'Eclairage (CIE) L*a*b* coordinates, wherein L* indicates lightness, a* is the red/green coordinate, and b* is the yellow/blue coordinate. The larger the L* value, the lighter the color, and the smaller the L* value, the darker the color. The larger the a* value, the redder the color, the smaller the a* value the greener the color. The larger the b* value, the yellower the b* value, and the smaller the b* value, the bluer the color. The color change of the ink formulation from its state before erasure ($L^*_1$, $a^*_1$, and $b^*_1$) and after erasure ($L^*_2$, $a^*_2$, and $b^*_2$) can be indicated by calculating $\Delta L^*$, $\Delta a^*$, and $\Delta b^*$, according to the formulas below:

$$\Delta L^* = L^*_2 - L^*_1$$

$$\Delta a^* = a^*_2 - a^*_1$$

$$\Delta b^* = b^*_2 - b^*_1$$

A positive $\Delta L^*$ will indicate that the sample became lighter after erasure, while a negative $\Delta L^*$ will indicate that the sample became darker after erasure. For example, a positive $\Delta L^*$ when measuring the effect of erasure on a colored dry erase ink on a white substrate may indicate that the dry erase ink was lightened by erasure.

A positive $\Delta a^*$ will indicate that the sample became redder after erasure, while a negative $\Delta a^*$ will indicate that the sample became greener after erasure. For example, a positive $\Delta a^*$ when measuring the effect of erasure on a green colored dry erase ink on a white substrate may indicate that the green color of the dry erase ink was at least partially removed by erasure.

A positive $\Delta b^*$ will indicate that the sample became yellower after erasure, while a negative $\Delta b^*$ will indicate that the sample became bluer after erasure. For example, a positive $\Delta a^*$ when measuring the effect of erasure on a blue colored dry erase ink on a white substrate may indicate that the blue color of the dry erase ink was at least partially removed by erasure. As would be readily understood by one of skill in the art, measuring Δa* and Δb* may be particularly useful in evaluating the erasability of dry erase inks which are initially red or blue in color.

The total color difference between all three coordinates L*, a*, and b* can be evaluated by calculating the total color difference, ΔE*, according to the formula below:

$$\Delta E^* = [\Delta L^{*\cdot 2} + \Delta a^{*\cdot 2} + \Delta b^{*\cdot 2}]/2$$

In some embodiments, the ink formulations may be considered erased when write test samples of the ink on a white substrate exhibit a ΔE* value of from about 40 to about 100, a ΔL* value of from about 1 to about 100, a Δa* value of from about +/−0.1 to about +/−90, a Δb* value of from about +/−0.1 to about +/−90, or any combination thereof, including any ranges therebetween. In some embodiments, the ink formulations may be considered to show a lightening upon erasure which is noticeable by a consumer when the write test samples of the ink on a white substrate exhibit a ΔE* value of about 4 or greater. For example, in some embodiments, the ink formulations may be considered erased when write test samples of the ink on a white substrate exhibit a ΔE* value of from about 40 to about 50, from about 50 to about 80, about 50, about 60, about 70, about 80, about 90, about 95, about 100, or any ranges therebetween. In some embodiments, the ink formulations may be considered erased when the write test samples of the ink on a white substrate exhibit a ΔL* value of from about 5 to about 40, from about 40 to about 60, from about 50 to about 95, about 1, about 10, about 20, about 30, about 40, about 50, about 60, about 70, about 80, about 90, about 95, about 100, or any ranges therebetween. In some embodiments, the ink formulations may be considered erased when the write test samples of the ink on a white substrate exhibit a Δa* value of from about −60 to about 60, from about −60 to about −0.1, from about 0.1 to about 90, from about 25 to about −5, from about 5 to about 25, from about −60 to about −30, from about 30 to about 60, for example about −90, about −80, about −70, about −60, about −50, about −40, about −30, about −20, about −10, about 0, about 10, about 20, about 30, about 40, about 50, about 60, about 70, about 80, about 90 or any ranges therebetween. In some embodiments, the ink formulations may be considered erased when the write test samples of the ink on a white substrate exhibit a Δb* value of from about −90 to about −50, about 50 to about 90, about −40 to about −20, about 20 to about 40, about −20 to about −0.1, about 0.1 to about 20, about −90, about −80, about −70, about −60, about −50, about −40, about −30, about −20, about −10, about −0.1, about 0.1, about 10, about 20, about 30, about 40, about 50, about 60, about 70, about 80, about 90, or any ranges therebetween.

In some embodiments, the color of an ink formulation before and after erasure may be evaluated using the CIE L*C*h coordinates, where L* indicates lightness, C* indicates chroma, and h is the hue angle. The color change of the ink formulation from its state before erasure ($L^*_1$, $C^*_1$, and $h_1$) and after erasure ($L^*_2$, $C^*_2$, and $h_2$) can be indicated by calculating ΔL*, ΔC*, and Δh, according to the formulas below:

$$\Delta L^* = L^*_2 - L^*_1$$

$$\Delta C^* = C^*_2 - C^*_1$$

$$\Delta h = h_2 - h_1$$

In some embodiments, the ink formulations may be considered erased when the ink before and after erasure exhibits a ΔL* value of from about 1 to about 100, ΔC* value of from about 0.1 to about 90, a Δh value of from about 1° to about 360°, or any combination thereof, including any ranges therebetween. For example, in some embodiments, the ink formulations may be considered erased when the write test samples of the ink on a white substrate exhibit a ΔL* value of from about 5 to about 40, from about 40 to about 60, from about 50 to about 95, about 1, about 10, about 20, about 30, about 40, about 50, about 60, about 70, about 80, about 90, about 95, about 100, or any ranges therebetween. In some embodiments, the ink formulations may be considered erased when the write test samples of the ink on a white substrate exhibit a ΔC* value of 0.1 to about 20, about 25 to about 70, about 75 to about 90, about 0.1, about 10, about 20, about 30, about 40, about 50, about 60, about 70, about 80, about 90, or any ranges therebetween. In some embodiments, the ink formulations may be considered erased when the write test samples of the ink on a white substrate exhibit a Δh value of about 1°, about 30°, about 60°, about 90°, about 120°, about 150°, about 180°, about 210°, about 240°, about 270°, about 300°, about 330°, about 360°, or any ranges therebetween.

Writing Instruments

Writing instruments are also provided herein. In some embodiments, the writing instruments include a writing tip portion connected to a tubular member or refill defining an ink reservoir, and any of the ink formulations described herein disposed in the ink reservoir. In some embodiments, the writing tip portion is a marker tip. In some embodiments, the writing tip portion is a brush tip. In some embodiments, the writing tip portion is a round bullet-shaped polyester nib.

FIG. 1 illustrates a partial cutaway view of an embodiment of a writing instrument 110 according to the present disclosure. The writing instrument 110 includes a tubular body 111 defining an ink reservoir 112 that may house any of the ink formulations described herein. The writing instrument further includes a writing tip 116 that extends into the reservoir 112 by a distance 122. The tubular body 111 further may include a second end 120 that is configured to securely receive a cap (not shown) during use of the writing instrument.

EXAMPLES

Embodiments of the present disclosure may be better understood by reference to the following examples.

Example 1: Ink Formulations

First, ink formulations were prepared by mixing the ingredients listed in Table 1 below until a homogenous mixture was achieved. Ink formulations were prepared using Butonal® NS104 as a resin, Microsphere 230 MD as a pre-assembled colorant, C-800 BKG as a pre-assembled colorant, WR170 as a conventional colorant, water as a solvent, and propylene glycol as a co-solvent.

TABLE 1

| | Ink Formulations | | |
|---|---|---|---|
| Component | Wt. % of Component in Formulation No. 1 | Wt. % of Component in Formulation No. 2 | Wt. % of Component in Formulation No. 3 |
| Butonal NS104 | 40 | 40 | 40 |

TABLE 1-continued

Ink Formulations

| Component | Wt. % of Component in Formulation No. 1 | Wt. % of Component in Formulation No. 2 | Wt. % of Component in Formulation No. 3 |
|---|---|---|---|
| Microsphere 230MD | 10 | 0 | 0 |
| C-800 BKG | 0 | 10 | 0 |
| WR170 | 0 | 0 | 10 |
| Propylene Glycol | 10 | 10 | 10 |
| Water | 40 | 40 | 40 |
| | 100 | 100 | 100 |

Example 2: Erasability of Ink Formulations

After a homogeneous mixture was achieved, samples of ink formulation no. 2 described in Example 1 above were inserted into Sharpie® brand fine tip marker writing systems using injection syringes. The markers were left to prime for 10 minutes with the caps closed and marks were then made on various writing surfaces. After five minutes, the marks were erased using napkins. The erasability of the various ink formulations was assessed visually using a Likert Scale, wherein a score of 5 indicates exceptional erasability and a score of 1 indicates poor erasability, as detailed in Table 2 below. A red-colored Expo® brand dry erase marker was also used as a control ink, for comparison.

TABLE 2

Erasability of Ink Formulations

| | Writing Surfaces | | | | |
|---|---|---|---|---|---|
| Ink Formulation No. | Desk surface | Semi-gloss finish dry wall | Matt-finish dry wall | Dry Erase Board | Refrigerator |
| 1 | 5 | 5 | 4 | 5 | 5 |
| 2 | 5 | 5 | 4 | 5 | 5 |
| 3 | 3 | 2 | 2 | 4 | 4 |
| Expo ® brand marker ink | 2 | 1 | 1 | 5 | 5 |

Figure 2A:
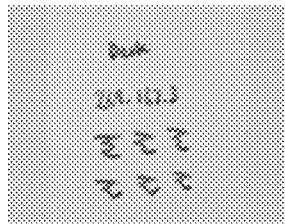
FIG. 2A is a photograph of write test samples made using embodiments of a dry erase ink formulation according to the present disclosure before erasure.
Figure 2B:
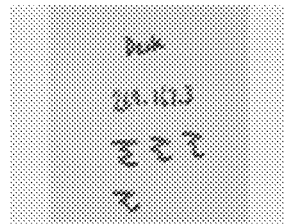
FIG. 2B is a photograph of write test samples made using embodiments of a dry erase ink formulation according to the present disclosure after erasure with a napkin.
Figure 3A:
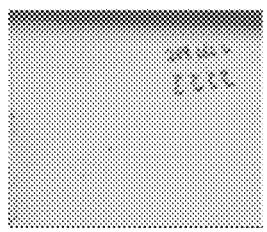
FIG. 3A is a photograph of write test samples made using embodiments of a dry erase ink formulation according to the present disclosure before erasure.
Figure 3B:
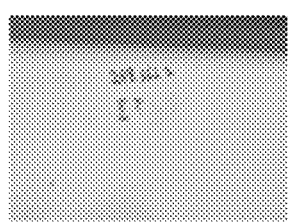
FIG. 3B is a photograph of write test samples made using embodiments of a dry erase ink formulation according to the present disclosure after erasure with a napkin.
Figure 4A:
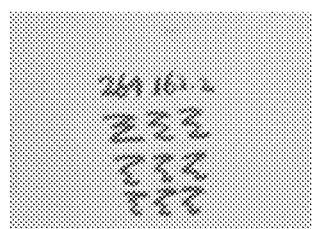
FIG. 4A is a photograph of write test samples made using embodiments of a dry erase ink formulation according to the present disclosure before erasure.
Figure 4B:
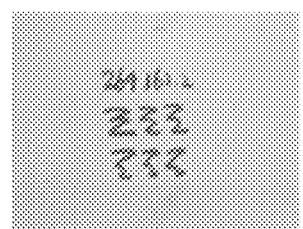
FIG. 4B is a photograph of write test samples made using embodiments of a dry erase ink formulation according to the present disclosure after erasure with a napkin.
Figure 5A:
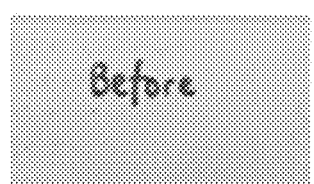
FIG. 5A is a photograph of write test samples made using embodiments of a dry erase ink formulation according to the present disclosure before erasure.
Figure 5B:
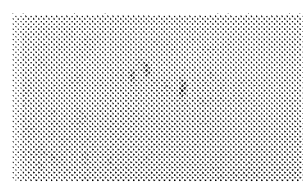
FIG. 5B is a photograph of write test samples made using embodiments of a dry erase ink formulation according to the present disclosure after erasure with a napkin.

FIG. 2A shows the ink formulations of Example 1 on a white laminated wood desk before erasure, and FIG. 2B shows these ink formulations after erasure with a napkin. FIG. 3A shows the ink formulations of Example 1 on a white, semi-gloss laminated wood cabinet before erasure, and FIG. 3B shows these ink formulations after erasure with a napkin. FIG. 4A shows the ink formulations of Example 1 on drywall coated with Glidden® brand semi-gloss all-in-one paint before erasure, and FIG. 4B shows these ink formulations after erasure with a napkin. FIG. 5A shows the ink formulations of Example 1 on drywall coated with Glidden® brand matte finish all-in-one paint before erasure, and FIG. 5B shows these ink formulations after erasure with a napkin.

Without intending to be bound by any particular theory, it is believed that the ink formulations of the present disclosure can be erased from surfaces other than white board surfaces, including porous surfaces, because they maintain a high hold out even when placed over a porous substrate.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A dry erase ink formulation comprising:
   a resin,
   a pre-assembled colorant, and
   a solvent,
   wherein the dry erase ink formulation has a surface tension of at least 25 dynes per centimeter, and wherein the resin is present in the dry erase ink formulation in an amount of at least 1 wt. %.

2. The dry erase ink formulation of claim 1, wherein the resin is present in the dry erase ink formulation in an amount of at least 5 wt. %.

3. The dry erase ink formulation of claim 1, wherein the resin is present in the dry erase ink formulation in an amount of at least 10 wt. %.

4. The dry erase ink formulation of claim 1, wherein the pre-assembled colorant is present in the dry erase ink formulation in an amount of at least 1 wt. %.

5. The dry erase ink formulation of claim 1, wherein the pre-assembled colorant is present in the dry erase ink formulation in an amount of at least 5 wt. %.

6. The dry erase ink formulations of claim 1, wherein the pre-assembled colorant is present in the dry erase ink formulation in an amount of at least 10 wt. %.

7. The dry erase ink formulation of claim 1, wherein the solvent is present in the dry erase ink formulation in an amount of at least 10 wt. %.

8. The dry erase ink formulation of claim 1, wherein the solvent is present in the dry erase ink formulation in an amount of from 10 wt. % to 25 wt. %.

9. The dry erase ink formulation of claim 1, wherein the solvent is present in the dry erase ink formulation in an amount of from 10 wt. % to 15 wt. %.

10. The dry erase ink formulation of claim 1, wherein the dry erase ink formulation further comprises a conventional colorant.

11. The dry erase ink formulation of claim 1, wherein the resin has a molecular weight of at least 1000 amu.

12. The dry erase ink formulation of claim 1, wherein the resin comprises poly(styrene-butadiene), carboxylate-terminated poly(styrene-butadiene), or combinations thereof.

13. The dry erase ink formulation of any claim 1, wherein the solvent comprises water, glycerol, propylene glycol, a polyalkylene glycol, a glycol ether, a poly(glycol) ether, a caprolactam, a formamide, an acetamide, a long chain alcohol, or any combination thereof.

14. The dry erase ink formulation of claim 1, wherein the solvent comprises N-methyl pyrrolidone, 1,5-pentanediol, 2-pyrrolidone, diethylene glycol, triethylene glycol, tetraethylene glycol, 1,3-(2-methyl)-propanediol, 1,3,5-(2- methyl)-pentanetriol, tetrametylene sulfone, 3-methoxy-3-methylbutanol, glycerol, a 1,2-alkyldiol, or any combination thereof.

15. The dry erase ink formulation of claim 1, wherein the pre-assembled colorant has a particle size of at least 1 μm.

16. A writing instrument comprising:
a writing tip portion connected to a tubular member or refill defining an ink reservoir; and
a dry erase ink formulation disposed in the ink reservoir, the ink formulation comprising:
a resin,
a pre-assembled colorant, and
a solvent,
wherein the dry erase ink formulation has a surface tension of at least 25 dynes per centimeter, and wherein the resin has a molecular weight of at least 1000 amu.

17. A dry erase ink formulation comprising:
a resin,
a pre-assembled colorant, and
a solvent,
wherein the dry erase ink formulation has a surface tension of at least 25 dynes per centimeter, and wherein the solvent is present in the dry erase ink formulation in an amount of from 10 wt. % to 25 wt. %.

18. The dry erase ink formulation of claim 17, wherein the pre-assembled colorant comprises EVOQUE 1180 coated microspheres.

19. The dry erase ink formulation of claim 17, wherein the pre-assembled colorant comprises MEARLIN Exterior CFS Fine Brass 2323V colorant-plated flakes.

* * * * *